Figure 1:
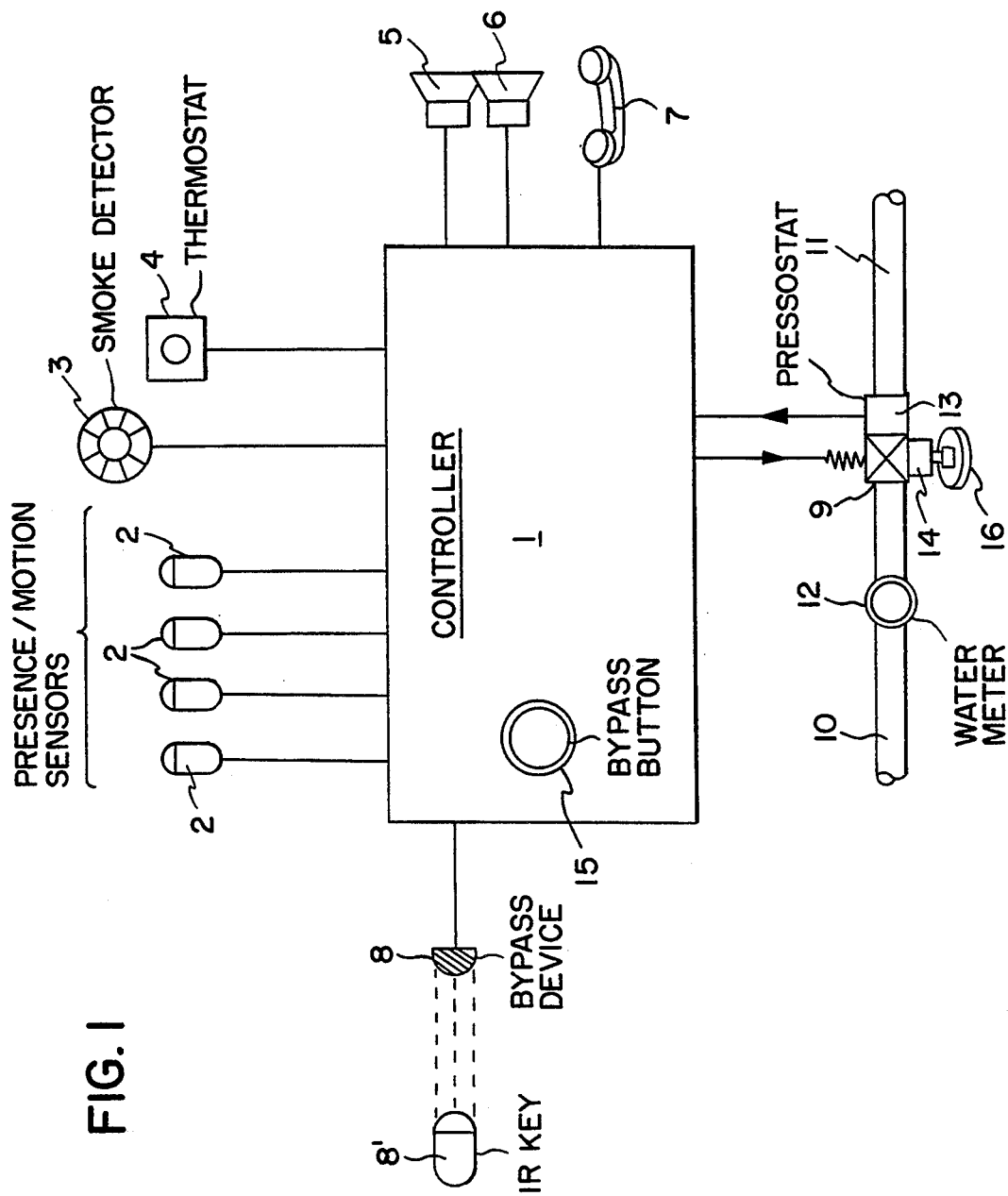

United States Patent [19]

Björkman

[11] Patent Number: 5,347,264
[45] Date of Patent: Sep. 13, 1994

[54] METHOD AND APPARATUS FOR AUTOMATICALLY CONTROLLING A WATER SUPPLY USING MOVEMENT DETECTOR MEANS

[75] Inventor: Mats Björkman, Bromma, Sweden

[73] Assignee: RB Larmprodukter AB, Bromma, Sweden

[21] Appl. No.: 984,583

[22] PCT Filed: Sep. 4, 1991

[86] PCT No.: PCT/SE91/00579
§ 371 Date: Mar. 8, 1993
§ 102(e) Date: Mar. 8, 1993

[87] PCT Pub. No.: WO92/05385
PCT Pub. Date: Apr. 2, 1992

[30] Foreign Application Priority Data
Sep. 14, 1990 [SE] Sweden ............... 9002932

[51] Int. Cl.⁵ .................................. G08B 21/00
[52] U.S. Cl. .................... 340/611; 340/605; 137/487.5; 137/551
[58] Field of Search ............ 340/603, 604, 605, 611; 4/623, DIG. 3, 302, 304, 305; 137/487.5, 551

[56] References Cited

U.S. PATENT DOCUMENTS

| | | | |
|---|---|---|---|
| 4,107,941 | 8/1978 | Hamilton | 62/186 |
| 4,402,095 | 9/1983 | Pepper | 4/623 |
| 4,823,414 | 4/1989 | Piersimoni et al. | 4/623 |
| 5,004,014 | 4/1991 | Bender | 137/487.5 X |

FOREIGN PATENT DOCUMENTS 3414510  3/1990  Fed. Rep. of Germany.
WO86/06457  11/1986  PCT Int'l Appl.

*Primary Examiner*—Jeffery A. Hofsass
*Attorney, Agent, or Firm*—Shapiro and Shapiro

[57] ABSTRACT

The method and apparatus relates to a procedure and an arrangement for minimizing the risk of the undesired escape of water from pipe systems and units connected thereto in premises and similar surroundings by the use of a control or valve arrangement arranged at the point of connection of the pipe system to the external supply pipe and capable of regulation by means of an adjuster device. A link is provided between the valve arrangement and the device for detecting the presence or movement of individuals inside the premises, and the operation is such that, in the event of the detection of presence or movement, the valve is kept open so as to permit water to enter the pipe system or network, whereas the valve is kept closed in the absence of such detection.

14 Claims, 1 Drawing Sheet

METHOD AND APPARATUS FOR AUTOMATICALLY CONTROLLING A WATER SUPPLY USING MOVEMENT DETECTOR MEANS

TECHNICAL FIELD

This invention relates to an arrangement for a monitoring system or an alarm system comprising devices and sensing components for varying tasks, preferably a system which contains devices for the detection of entry into the area which the system is intended to cover.

In more detailed terms, the invention relates to an arrangement for an alarm system so arranged as to prevent and/or detect the unintended or otherwise accidental escape of water or similar from pipe systems or networks to which apparatuses and units are connected within the area concerned.

DESCRIPTION OF THE PRIOR ART

Already disclosed is a series of detecting devices which can be positioned, for example, beneath dishwashers and similar units for the purpose, in the event of the escape of water, of giving an alarm and/or causing the water supply to the unit to be switched off.

Also previously disclosed are so-called hose rupture valves, which sense any drop in the specified pressure beyond the valve and, this being the case, close the valve.

Also previously disclosed for the purpose of reducing the risk of the escape of water going undiscovered in apartment blocks, for example, is the arrangement of an electromagnetically actuated valve in the incoming main supply pipe, and the control of that valve by means of a manually operated switch arrangement located on the exterior door, i.e. on a so-called cam lock. The water is thus turned off on leaving the house and locking the door behind one.

Alarms and/or shut-off devices arranged on the respective units have failed to gain widespread acceptance, because intervention is required in the supply to each unit and, as a rule, a power supply must also be provided to the sensing and shut-off devices.

A shut-off arrangement capable of actuation by means of the exterior door lock obviously reduces the risk of water escaping when the apartment is empty, although it offers no protection when the occupants are at home or sleeping, or have not locked the exterior door for some reason. Of course, in an apartment or the like with several room, water can continue to escape without immediately being noticed. The risk of leaks can also increase at night, as the pressure in the pipes is then often higher than during the day, when consumption is greater.

OBJECT OF THE INVENTION

An object of the present invention is to provide a simple and reliable arrangement capable of integration into or connection to a control or alarm installation for other purposes, and which can monitor any pipe system or network without the need for intervention in the network to take place at more than a single point. The alarm system may be already existing or concurrently installed, and common components can be used for internal and external reporting and for giving the alarm.

A further object of the invention is to provide an arrangement which is activated or which starts to function as soon as the area or the premises supplied by the pipe system are not under supervision, and which is de-activated without the need for special measures when the area or the premises supplied by the pipe system are once more under supervision.

BRIEF DESCRIPTION OF THE PRESENT INVENTION

Basically speaking, the present invention provides, by relatively simple means, an arrangement for effective monitoring of water pipes and tapping points and the water consuming or utilizing units connected thereto.

The invention is based on the ideal of causing devices for sensing presence or movement in one or more areas to control the supply of water to the pipe network and the consumer units within those areas. Preferably, the arrangement of the invention is set up in such a way that not only presence as such, but also function or movement of a specified kind or to a specified extent has a determining effect on whether the water supply is to remain turned off or is to be allowed to flow.

In one preferred embodiment, use is made of presence or movement detectors from a premises monitoring installation, which are used to guard or scan the areas, and it is these detectors which indicate whether activity is taking place or persons are present in the premises.

Water under pressure is then made available at the tapping points and the other consumer units only when the presence and/or movement detectors indicate that persons are present and/or moving around in the area in question.

If, on the other hand, no presence or no movement is detected after an appropriate transitional period (for example, the premises are unoccupied or the occupants are asleep), the main inlet valve will be closed and kept closed. For as long as the main inlet valve remains closed, of course, it is not possible for the leakage or escape of water to occur, Any escape of water would be able to occur only when the water is turned on and, accordingly, when persons who might be expected to discover the escape are present.

In one preferred embodiment of the arrangement in accordance with the invention, the system is supplemented with devices for the repeated verification of the tightness of the pipework and apparatus which is supplied via the main inlet valve. A meter for measuring the drop in pressure, preferably in the form of a pressostat, is arranged in the pipeline ahead of or combined with the main inlet valve, and the meter is adjustable and set in such a way as to measure the drop in pressure per unit of time in the pipe network which is isolated on closing the main inlet valve. The meter or pressostat can be calibrated so that it will tolerate the ordinary dripping of a tap, but will immediately indicate if the drop in pressure per unit of time denotes some other undesired leakage or escape. The meter or pressostat is connected to a central monitoring unit, which is able to actuate devices for emitting a local alarm or for establishing a reporting link with an alarm control centre or the like.

In order to achieve even greater reliability, the arrangement is supplemented with a locking device which, when the meter or pressostat identifies a leak or escape of unacceptable magnitude, locks the main inlet valve in the closed position and by so doing prevents its automatic opening as the result of a presence or movement indication. Such locking can be effected electronically by the control circuit for the opening function in the monitoring unit being blocked, although it can also take place by electromechanical means, such as by use of a magnetically actuated valve, and can be controlled from the aforementioned unit. In the first place, a manually actuated control device may suitably be arranged in the monitoring unit, which control device, after locking of this kind, will at least permit the occasional opening of the valve. The locking function is otherwise suitably so arranged that, as soon as the cause of the escape has been eliminated, and after the manually executed turning-on of the water in order to verify that the pressure drop lies within permissible limits, it will render the locking inactive so that the presence or movement detectors are once more able to control the inlet valve. It is also possible to arrange a manual control device on the valve, for example for use in the event of power supply failure or other functional breakdown.

DESCRIPTION OF THE ILLUSTRATIVE EMBODIMENT

The invention is described below in more detail with reference to the accompanying drawing, which illustrates in schematic form how the arrangement in-accordance with the invention can be integrated into an alarm system.

The reference 1 is used in the drawing to designate an alarm control apparatus, to which a number of presence and/or movement detectors 2, for example, IR detectors are connected and also, for example, smoke detectors 3, a thermostat 4 and other appropriate detection or sensing devices which are not shown here. Interior or exterior sirens 5 and 6, for example, can be connected to the control unit 1, and there is also connected to it an automatic telephone ringing device 7, which is suitably integrated into the control unit and is able to provide external communication. The reference 8 is used to designate a by-pass device with a so-called IR key 8.

In accordance with the invention a water inlet valve 9 connected between the exterior main supply pipe 10 and the pipe network or system 11 of the house or building itself is connected to the control unit 1, and more specifically to a unit contained inside it and which is activated by the presence or movement detectors 2. A water meter 12 is also connected on the main pipe side. The inlet valve 9 is controlled and operated by impulses from the control unit 1, in accordance with a predetermined program, and in response to signals transmitted by the detectors 2.

A pressure drop meter or pressostat 13 is arranged quite close to the inlet valve 9, which as a general rule consists of a so-called solenoid valve, on the side which is isolated from the main supply pipe 10 when the valve 9 is closed. This meter or pressostat, which has adjustable activation or alarm levels, will begin to sense the pressure drop in the pipe network 11 as soon as the inlet valve 9 is closed. If the pressure drop is excessively high as a result of a large volume of water having escaped from the network or the system 11, an activation signal is transmitted to the control unit 1 enabling the alarm to De given. The inlet valve is equipped with a locking device 14, which is controlled from the control unit 1 on the basis of signals transmitted by the pressure drop meter 13, and which, when escape or leakage is identified, locks the valve 9 in the closed position. The valve 9 is prevented from being opened even if the detectors 2 give the "correct" signal (presence or movement detected). Thus, the escape of water by way of the valve 9 is prevented, in spite of presence or activity being detected. The inlet valve thus remains closed after escape or leakage has been identified, until such time as it is opened manually by means of a by-pass button 15 on the control unit or the handle 16 on the valve. In the normal case, this will be done when the cause of the escape has been eliminated.

While a preferred embodiment of the invention has been described herein, it will be appreciated that various changes and modifications are possible in keeping with principles and spirit of the invention, the scope of which is defined in the appended claims. For example, the invention can readily be applied to provide control of seperable pipe networks wherein, as in the illustrative case, each pipe network may include one or more consumption points.

I claim:

1. A method of minimizing risk of leakage of water from a pipe system supplying water from a main supply line to one or more output points in a premises, comprising the steps of providing a valve between the pipe system and the main supply line, detecting whether there is at least one of presence or movement of an individual within the premises independently of demand for water any output point, automatically maintaining said valve in an open state when said one of presence or movement is detected and automatically maintaining said valve in a closed state when said one of presence or movement is not detected.

2. A method according to claim 1, wherein said one of presence or movement is detected by a sensor which monitors a predetermined area within the premises.

3. A method according to claim 2, wherein said sensor is a movement sensor.

4. A method according to claim 1, further comprising the step of providing a pressure drop sensor in the pipe system and activating an alarm if the pressure drop sensor senses more than a predetermined pressure drop in the pipe system when said valve is in the closed state.

5. A method according to claim 1, further comprising the step of providing a pressure drop sensor in the pipe system and, if the pressure drop sensor senses more than a predetermined pressure drop in the pipe system when said valve is in the closed state, activating a device which keeps said valve in the closed state regardless of whether said one of presence or movement of an individual is detected.

6. A method according to claim 1, wherein said valve is automatically maintained open in response to detection of motion of an individual within the premises independently of demand for water at any output point, and is automatically closed if no such motion is detected within a predetermined interval.

7. A method according to claim 1, wherein said one of presence or movement is detected by an IR detector having an adjustable delay device connected thereto.

8. Apparatus for minimizing risk of leakage of water from a pipe system supplying water from a main supply line to one or more output points in a premises, comprising a valve disposed between the pipe system and the main supply line, means for detecting if there is at least one of presence or movement of an individual within the premises independently of demand for water at any output point, means for automatically opening said valve when said one of presence or movement is detected, and means for automatically closing said valve when said one of presence or movement is not detected.

9. Apparatus according to claim 8, wherein said detecting means comprises a sensor which monitors a predetermined area within the premises for said one of presence or movement.

10. Apparatus according to claim 9, wherein said sensor is a movement sensor.

11. Apparatus according to claim 8, further comprising a pressure drop sensor disposed in the pipe system and means for activating an alarm in response to detection of more than a predetermined pressure drop in the pipe system by said pressure drop sensor when said valve is closed.

12. Apparatus according to claim 8, further comprising a pressure drop sensor disposed in the pipe system and means responsive to detection of more than a predetermined pressure drop in the pipe system by said pressure drop sensor when said valve is closed, for activating a device which locks said valve closed regardless of whether said one of presence or movement of an individual is detected.

13. Apparatus according to claim 8, wherein said detecting means detects movement of an individual within the premises independently of demand for water at any output point, said apparatus further including means for automatically closing said valve if no such movement is detected within a predetermined interval.

14. Apparatus according to claim 8, wherein said detecting means comprises an IR detector having an adjustable delay device connected thereto.

* * * * *